(12) United States Patent
Wu

(10) Patent No.: US 6,919,800 B2
(45) Date of Patent: Jul. 19, 2005

(54) CAR WINDOW CORNICE PROVIDED WITH A SIGNAL LIGHT

(76) Inventor: Hui-Pi Wu, No. 34, Nan Ping 2nd Street, Yuan Lin Township, Chang Hua Hsien (TW)

( * ) Notice: Subject to any disclaimer, the term of this patent is extended or adjusted under 35 U.S.C. 154(b) by 11 days.

(21) Appl. No.: 10/634,364

(22) Filed: Aug. 7, 2003

(65) Prior Publication Data

US 2004/0100370 A1 May 27, 2004

(30) Foreign Application Priority Data

Aug. 23, 2002 (TW) ...................................... 91213465 U

(51) Int. Cl.⁷ .................................................. B60Q 1/26
(52) U.S. Cl. ........................ 340/463; 362/501; 362/492
(58) Field of Search ................................. 340/463, 465, 340/468, 475; 362/501, 503, 459, 479, 492; 296/1.01, 97.1; 40/556, 569, 591

(56) References Cited

U.S. PATENT DOCUMENTS

| 5,174,643 | A | * | 12/1992 | Priesemuth | 362/464 |
| 5,560,701 | A | * | 10/1996 | Payne | 362/493 |
| 6,379,029 | B1 | * | 4/2002 | Stanton | 362/501 |
| 6,511,216 | B2 | * | 1/2003 | Strickland | 362/542 |
| 6,619,824 | B1 | * | 9/2003 | Hou | 362/501 |

\* cited by examiner

*Primary Examiner*—John Tweel, Jr.
(74) *Attorney, Agent, or Firm*—Alan D. Kamrath; Nikolai & Mersereau, P.A.

(57) ABSTRACT

A window cornice is designed to fasten to the external top edge of a window frame of an automotive vehicle for providing protection against the rain or sun. The window cornice is provided with at least one light-emitting device which is incorporated into the signal light system of the automotive vehicle.

6 Claims, 6 Drawing Sheets

CAR WINDOW CORNICE PROVIDED WITH A SIGNAL LIGHT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an automotive accessory, and more particularly to a window cornice of a motor vehicle.

BACKGROUND OF THE INVENTION

The conventional car window cornice is fastened along the external top edge of a car window frame for protection against the rain or sun only. As a result, it has enjoyed a very limited popularity along the consumer at large.

BRIEF SUMMARY OF THE INVENTION

The primary objective of the present invention is to provide a versatile car window cornice which is designed to protect against the rain or sun and is incorporated into the signal light system of a motor vehicle.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

As shown in FIGS. 1–4, a car window cornice 10 embodied in the present invention is integrally made and is fastened to the external top edge of a car window frame 20 for providing protection against the rain or sun.

Figure 1:
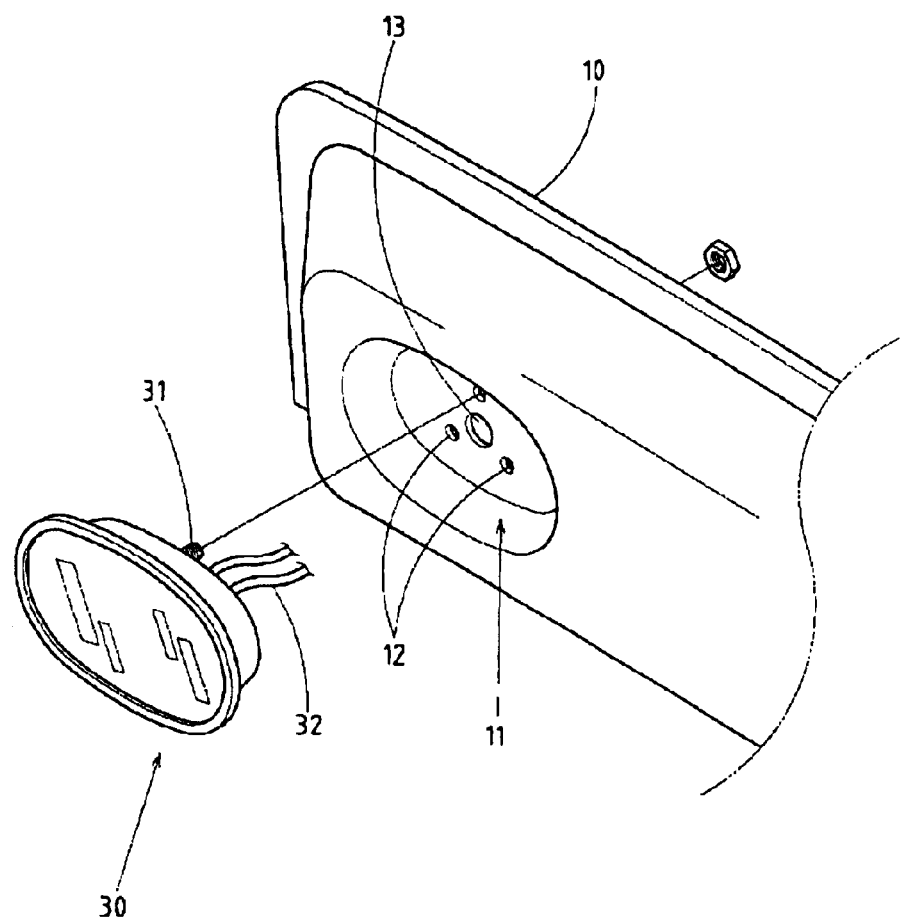
FIG. 1 shows an exploded perspective view of a first preferred embodiment of the present invention.
Figure 2:
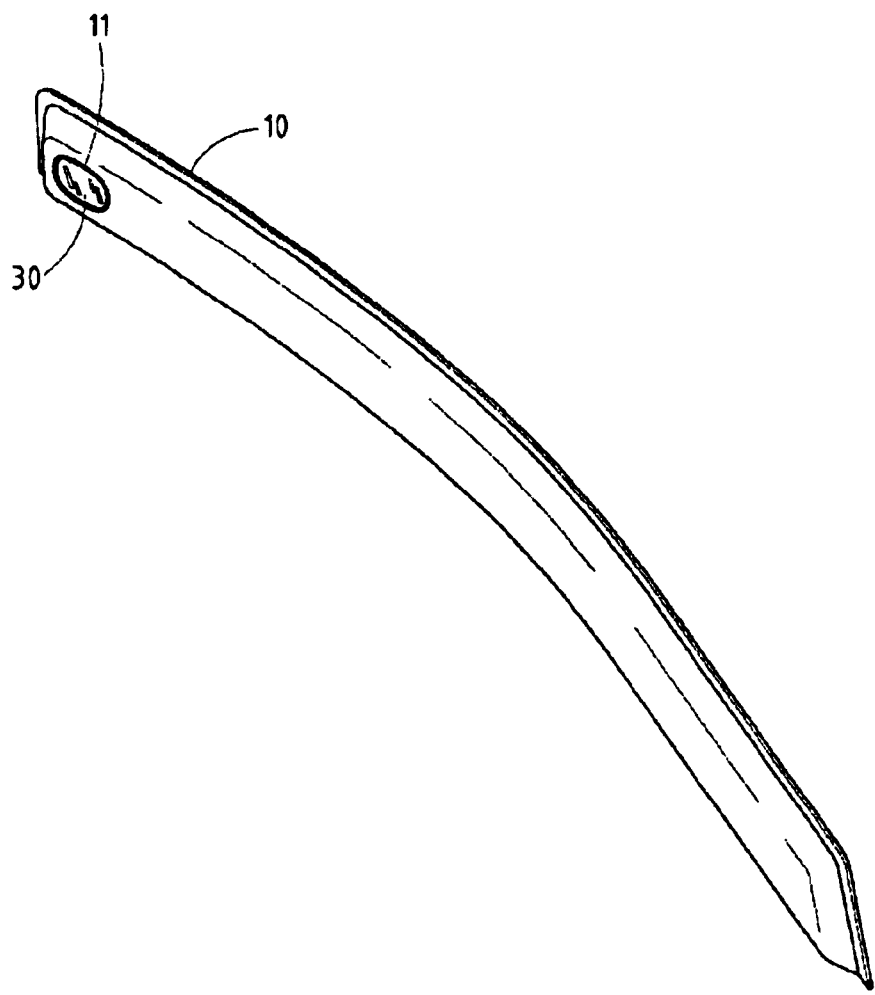
FIG. 2 shows a perspective view of the first preferred embodiment of the present invention.
Figure 3:
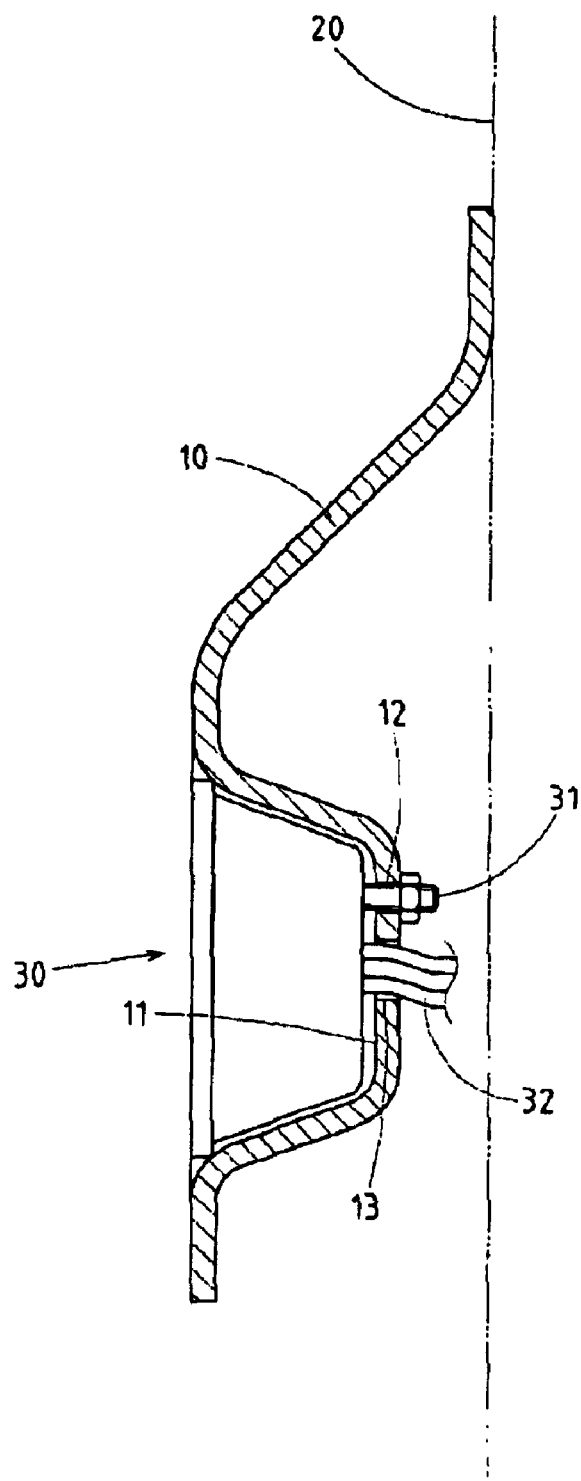
FIG. 3 shows a sectional schematic view of the first preferred embodiment of the present invention.
Figure 4:
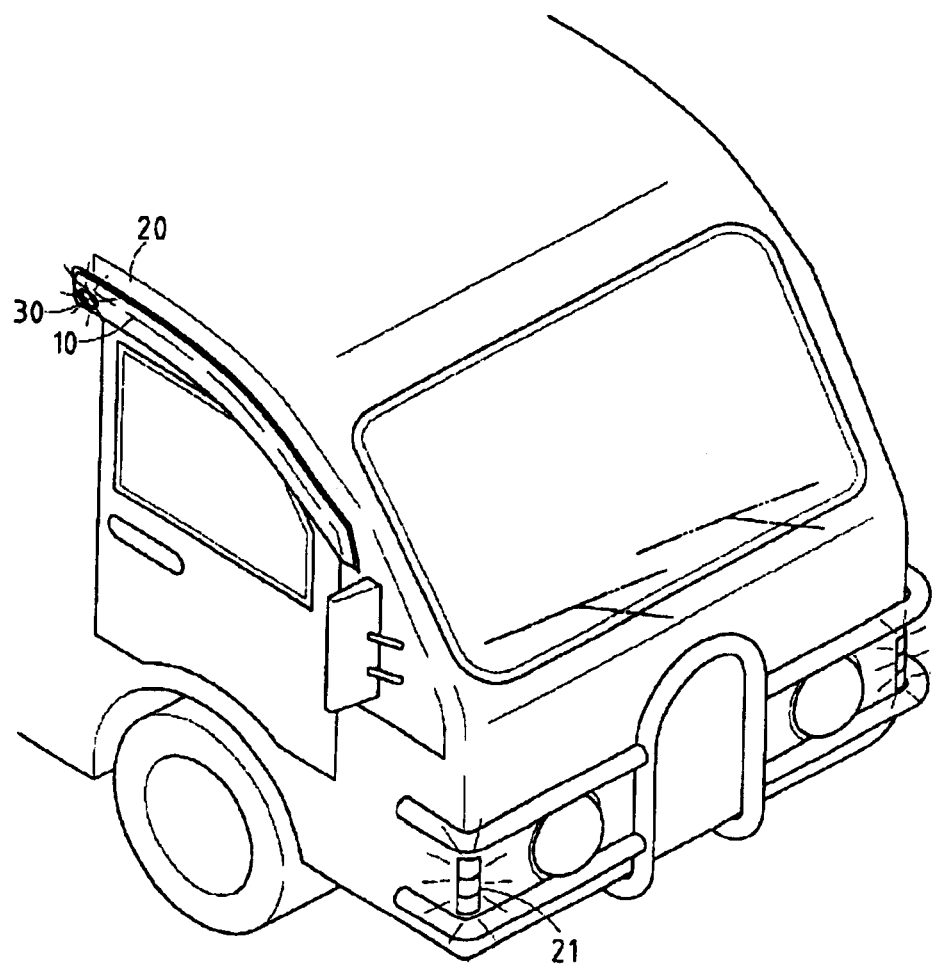
FIG. 4 shows a schematic view of the first preferred embodiment of the present invention at work.

The car window cornice 10 is provided in a lower portion of the external side thereof with at least one slot 11 to accommodate a light-emitting device 30, such as light-emitting diode or light bulb. The slot 11 is provided in the bottom wall with a plurality of fastening holes 12 and a wire hole 13. The light-emitting device 30 is provided with a plurality of fastening bolts 31 and electric wires 32. The light-emitting device 30 is secured to the slot 30 by the fastening bolts 31 which are engaged with the fastening holes 12. The electric wires 32 are connected to the signal light system 21 of a motor vehicle. In another words, the light-emitting device 30 of the car window cornice 10 works synchronously with the built-in signal lights 21, as illustrated in FIG. 4, thereby enhancing the signaling effect.

Figure 5:
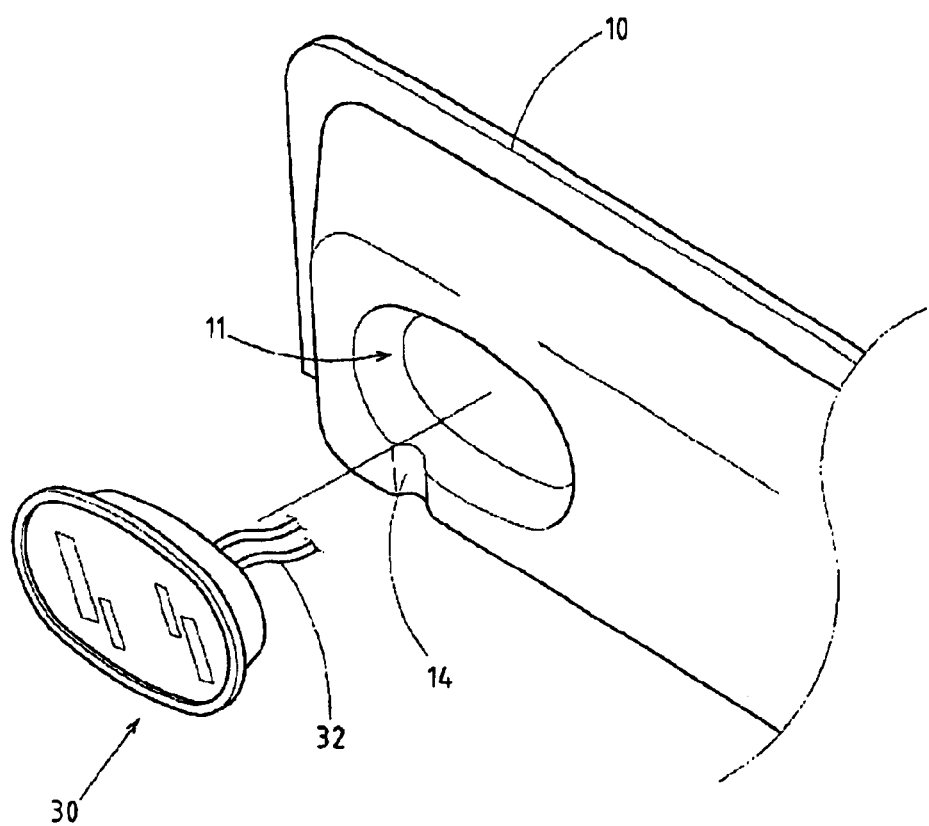
FIG. 5 shows an exploded perspective view of a second preferred embodiment of the present invention.

As shown in FIG. 5, the cornice 10 is provided with a groove 14 in communication with the slot 11. The groove 14 is used to accommodate the electric wires 32 of the light-emitting device 30. In another words, the groove 14 is disposed in place of the wire hole 13 of the bottom wall of the slot 11.

Figure 6:
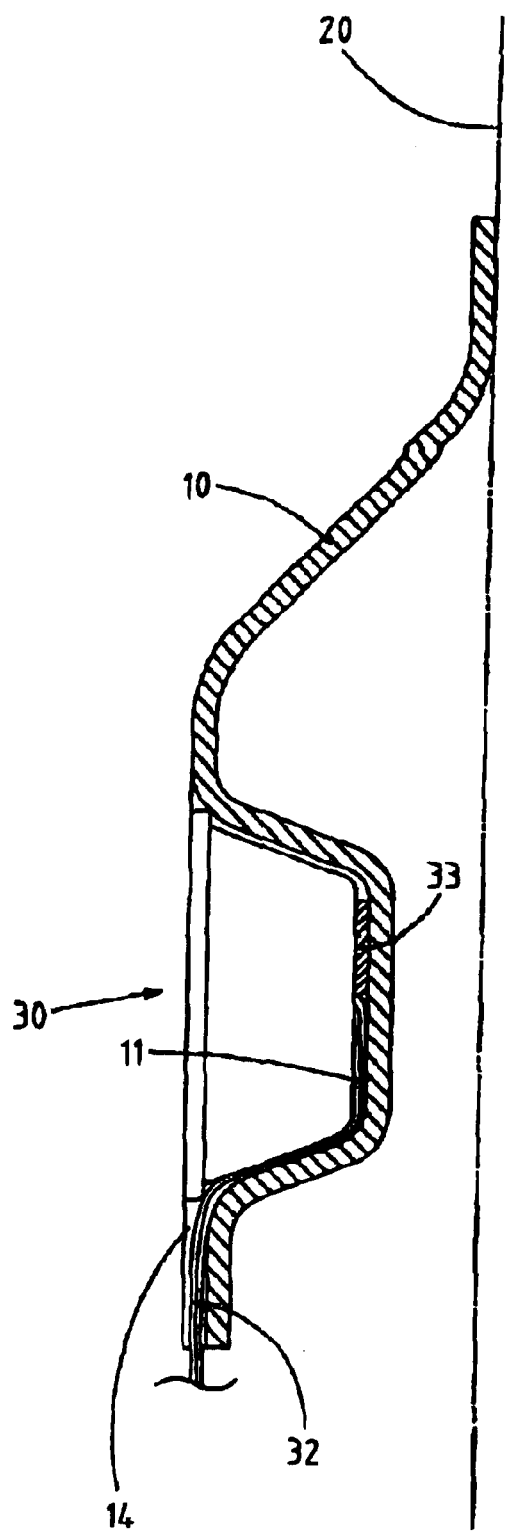
FIG. 6 shows a sectional schematic view of the second preferred embodiment of the present invention.

As shown in FIGS. 5 and 6, the light-emitting device 30 is devoid of the fastening bolts 31 and is fastened to the slot 11 by an adhesive tape 33, which is coated on both sides thereof with an adhesive.

The embodiments of the present invention described above are to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A window cornice fastened to the external top edge of a window frame of a motor vehicle, said window cornice comprising: a body comprised of, in an external side thereof, at least one slot and one light-emitting device secured to said slot such that said light-emitting device is incorporated into the signal light system of the motor vehicle.

2. The window cornice as defined in claim 1, wherein said light-emitting device is comprised of means to fasten said light-emitting device with said slot.

3. The window cornice as defined in claim 2, wherein said fastening means is comprised of a fastening screw which is attached to said light-emitting device and is fastened onto a bottom wall of said slot.

4. The window cornice as defined in claim 2, wherein said fastening means is comprised of an adhesive tape which is coated on both sides thereof with an adhesive, with one side of the tape being attached to said light-emitting device, and with another side of the tape being attached to a bottom wall of said slot.

5. The window cornice as defined in claim 1, wherein said slot is provided in a bottom wall thereof with a hole through which the electric wires of said light-emitting device are connected to the signal light system of the motor vehicle.

6. The window cornice as defined in claim 1, wherein said body of said window cornice is comprised of a groove in communication with said slot whereby said groove is used to accommodate the electric wires of said light-emitting device so as to facilitate the connecting of the electric wires to the signal light system of the motor vehicle.

* * * * *